United States Patent
Sunderrajan et al.

(10) Patent No.: US 11,869,348 B2
(45) Date of Patent: Jan. 9, 2024

(54) PROCESSING APPARATUS AND METHOD FOR GENERATING ROUTE NAVIGATION DATA

(71) Applicant: GRABTAXI HOLDINGS PTE. LTD., Singapore (SG)

(72) Inventors: Abhinav Sunderrajan, Singapore (SG); Jagannadan Varadarajan, Singapore (SG); Robinson Immanuel Kudali, Singapore (SG); Xiaocheng Huang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/011,137

(22) PCT Filed: Jun. 14, 2021

(86) PCT No.: PCT/SG2021/050343
§ 371 (c)(1),
(2) Date: Dec. 16, 2022

(87) PCT Pub. No.: WO2022/031222
PCT Pub. Date: Feb. 10, 2022

(65) Prior Publication Data
US 2023/0196907 A1    Jun. 22, 2023

(30) Foreign Application Priority Data
Aug. 1, 2020    (SG) ............................ 10202007346X

(51) Int. Cl.
*G08G 1/01*    (2006.01)
*G06N 20/00*    (2019.01)
(Continued)

(52) U.S. Cl.
CPC ....... *G08G 1/0125* (2013.01); *G01C 21/3492* (2013.01); *G01C 21/3667* (2013.01);
(Continued)

(58) Field of Classification Search
CPC .... G08G 1/0125; G08G 1/012; G08G 1/0141; G08G 1/056; G08G 1/065; G01C 21/3492; G01C 21/3667; G01C 21/3691
See application file for complete search history.

(56) References Cited

U.S. PATENT DOCUMENTS 7,706,964 B2 *   4/2010  Horvitz ............... G08G 1/0112
                                                          342/357.31
7,739,040 B2 *   6/2010  Horvitz ................. G01C 21/34
                                                             701/414
(Continued)

FOREIGN PATENT DOCUMENTS

| CN | 108920481 | 11/2018 |
| DE | 102017130418 | 6/2018 |
| WO | WO18224750 | 12/2018 |

OTHER PUBLICATIONS

Written Opinion for Application No. PCT/SG2021/050343, dated Jul. 19, 2021 (4 pages).
(Continued)

*Primary Examiner* — Luis A Martinez Borrero
(74) *Attorney, Agent, or Firm* — Buckley, Maschoff & Talwalkar LLC

(57) ABSTRACT

A processing apparatus for generating route navigation data is provided, to, generate training data based on road network data corresponding to a network of roads in a defined geographical area, and journey data sets, each journey data set comprising data indicative of a journey by a road user through the network of roads and being derived using geolocation transmissions from a communications device of the road user, train a classifier model based on the training
(Continued)

data, apply the trained classifier model on road data corresponding to a road in the defined geographical area, for the trained classifier model to predict a direction of traffic flow on the road, and generate the route navigation data indicative of the predicted direction of the traffic flow on the road. A method for generating route navigation data is also provided.

16 Claims, 4 Drawing Sheets

(51) Int. Cl.
 *G01C 21/34* (2006.01)
 *G01C 21/36* (2006.01)
 *G08G 1/056* (2006.01)
 *G08G 1/065* (2006.01)
(52) U.S. Cl.
 CPC ......... *G01C 21/3691* (2013.01); *G06N 20/00* (2019.01); *G08G 1/012* (2013.01); *G08G 1/0141* (2013.01); *G08G 1/056* (2013.01); *G08G 1/065* (2013.01)

(56) References Cited

U.S. PATENT DOCUMENTS

| | | | | |
|---|---|---|---|---|
| 9,846,049 | B2* | 12/2017 | Krumm | G01C 21/3484 |
| 10,473,478 | B1* | 11/2019 | Seshadri | G01C 21/3492 |
| 10,540,895 | B2* | 1/2020 | Hosokawa | B60W 30/0953 |
| 11,237,013 | B2* | 2/2022 | Seshadri | G08G 1/012 |
| 11,636,756 | B2* | 4/2023 | Fowe | G08G 1/0141 |
| | | | | 701/119 |
| 2001/0044696 | A1 | 11/2001 | Saitou et al. | |
| 2008/0071465 | A1* | 3/2008 | Chapman | G08G 1/0104 |
| | | | | 701/117 |
| 2009/0070031 | A1 | 3/2009 | Ginsberg | |
| 2010/0010733 | A1* | 1/2010 | Krumm | G01C 21/3484 |
| | | | | 706/47 |
| 2012/0004845 | A1 | 1/2012 | Kmiecik et al. | |
| 2012/0053755 | A1 | 3/2012 | Takagi | |
| 2012/0232733 | A1 | 9/2012 | Hernin et al. | |
| 2013/0096829 | A1 | 4/2013 | Kaito et al. | |
| 2016/0125734 | A1 | 5/2016 | Stenneth | |
| 2016/0334221 | A1 | 11/2016 | Davidson | |
| 2018/0283895 | A1* | 10/2018 | Aikin | G01C 21/3415 |
| 2019/0266890 | A1* | 8/2019 | Lei | G08G 1/096716 |
| 2019/0311619 | A1* | 10/2019 | Tao | G08G 1/0145 |
| 2020/0033151 | A1* | 1/2020 | Seshadri | G06Q 20/20 |
| 2020/0193808 | A1* | 6/2020 | Guan | G08G 1/052 |
| 2020/0273328 | A1* | 8/2020 | Mubarek | G01C 21/3492 |
| 2020/0334978 | A1* | 10/2020 | Pittman | H04L 47/821 |
| 2021/0001857 | A1* | 1/2021 | Nishitani | B60W 30/18163 |
| 2021/0019376 | A1* | 1/2021 | Neubauer | G08G 1/0129 |
| 2021/0150892 | A1* | 5/2021 | Xu | G08G 1/005 |
| 2021/0150893 | A1* | 5/2021 | Mubarek | G08G 1/0129 |
| 2021/0150894 | A1* | 5/2021 | Mubarek | G08G 1/0129 |
| 2022/0113154 | A1* | 4/2022 | Seshadri | G01C 21/3691 |
| 2022/0130238 | A1* | 4/2022 | Mubarek | G08G 1/0141 |

OTHER PUBLICATIONS

International Search Report for Application No. PCT/SG2021/050343, dated Jul. 19, 2021 (4 pages).

Singapore Examination Report Application No. 10202007346X, dated Sep. 24, 2020 (5 pages).

Singapore Search Report Application No. 10202007346X, dated Aug. 24, 2020 (2 pages).

* cited by examiner

PROCESSING APPARATUS AND METHOD FOR GENERATING ROUTE NAVIGATION DATA

TECHNICAL FIELD

The invention relates generally to the field of at least one of navigation, mapping and communications. One aspect of the invention relates to a processing apparatus for generating route navigation data. Another aspect of the invention relates to a method for generating route navigation data.

One aspect of the invention has particular, but not exclusive, application to navigation (e.g., for vehicles) through one or more roads.

BACKGROUND

Digital road networks, including OpenStreetMap (OSM), etc., have proliferated over the past few years due to the increasing availability of driver trajectories, satellite images and advances in computer vision. While some digital maps are proprietary, OSM is crowd sourced and free.

Digital road network graphs are associated with several attributes such as direction of travel (DoT), street names, turn restrictions, U-turns, complex traffic intersections, number of lanes, road types, toll roads, traffic lights etc. It is essential that the aforementioned road attributes are correct to ensure that the given map can be used for routing and navigation. The features should not only be correct but should be periodically maintained and validated to account for the addition of new roads, new traffic rules, temporary/permanent road closures, to ensure seamless and safe navigation capabilities.

SUMMARY

Aspects of the invention are as set out in the independent claims. Some optional features are defined in the dependent claims.

Implementation of the techniques disclosed herein may provide significant technical advantages. The techniques may generate route navigation data for enabling navigation of traffic through one or more roads. The techniques may enable determination or prediction of a direction of traffic flow (or direction of travel) on one or more roads, using a classifier model that is or has been trained using road network data, and data derived from geolocation transmissions. The route navigation data that is generated corresponding to the predicted direction of the traffic flow on the road(s) may be communicated to road users to aid the road users in navigating through the road(s). With the trained model, the techniques disclosed herein may make predictions with a better accuracy.

Therefore, the techniques disclosed herein may enable one or more of (i) improved navigation experience for road users, (ii) better traffic management that may minimise navigation error by road users onto roads that may be classified as either for uni-directional traffic flow or bi-directional traffic flow, (iii) better traffic management to allow smoother flow of traffic, (iv) alert road users of the predicted direction of traffic flow or travel in advance to aid navigation, thereby potentially minimising traffic disruption, (v) improved safety with users having knowledge of the predicted direction of traffic flow or travel, and (vi) compliance with the travel direction based on the predicted direction of traffic flow.

In at least some implementations, the techniques disclosed herein reduce processing overhead or the burden on a processing apparatus for generating route navigation data, by applying a classifier model that has been trained to data associated with a road so as to predict the direction of traffic flow on the road.

In at least some implementations, the techniques disclosed herein reduce processing overhead by generating training data based on data that may already be available. For example, a service provider may have access to a database of geolocation transmissions associated with road users that use services provided by or associated with the service provider, where such geolocation transmissions may be used for generating the training data.

In at least some implementations, the techniques disclosed herein may process the route navigation data to generate at least one of visual information or audio information corresponding to the predicted direction of the traffic flow on the road for communication to road user(s).

In at least some implementations, the techniques disclosed herein may process data indicative of a digital map representative of the road network, and the route navigation data for communicating information corresponding to the predicted direction of the traffic flow on the road with the digital map.

In an exemplary implementation, the functionality of the techniques disclosed herein may be implemented in software running on a handheld communications device, such as a mobile phone. The software which implements the functionality of the techniques disclosed herein may be contained in an "app"—a computer program, or computer program product—which the user has downloaded from an online store. When running on the, for example, user's mobile telephone, the hardware features of the mobile telephone may be used to implement the functionality described below, such as using the mobile telephone's transceiver components to establish the secure communications channel for generating route navigation data.

BRIEF DESCRIPTION OF THE DRAWINGS

The invention will now be described, by way of example only, and with reference to the accompanying drawings in which.

DETAILED DESCRIPTION

Various embodiments may include techniques, which may include one or more systems and/or one or more methods, to discover one or more road attributes so as to provide an aid for routing and navigation, for example, from crowd sourced GPS (Global Positioning System) traces.

The techniques disclosed herein may make use of one or more of (i) statistical insights derived from large scale GPS trajectory data that may be in the possession of a service provider for, for example, transport-related services, (ii) map geometry models from internal maps (e.g., maps that may be available internally to or within a service provider) and open source map providers including Open Street Maps (OSM), (iii) application of artificial intelligence (AI)/machine learning (ML) models on GPS traces along with several other road attributes, and (iv) multitude of sensor signals such as speed, bearing, inertial motion sensor based readings, etc.

The techniques may provide for one or more methods to (automatically) discover and/or predict and/or validate one or more road attributes that may be needed for routing and navigation, such as the direction of travel (DoT) on a road or road segment. The techniques may further determine whether traffic on a road or road segment is one-way or bi-directional. The techniques may be carried out by leveraging GPS traces obtained, for example, from a plurality (e.g., millions) of transport-related services (e.g., rides) along with artificial intelligence (AI), and machine learning (ML) methods. Domain knowledge of the underlying map geometry may also be used.

Figure 1:
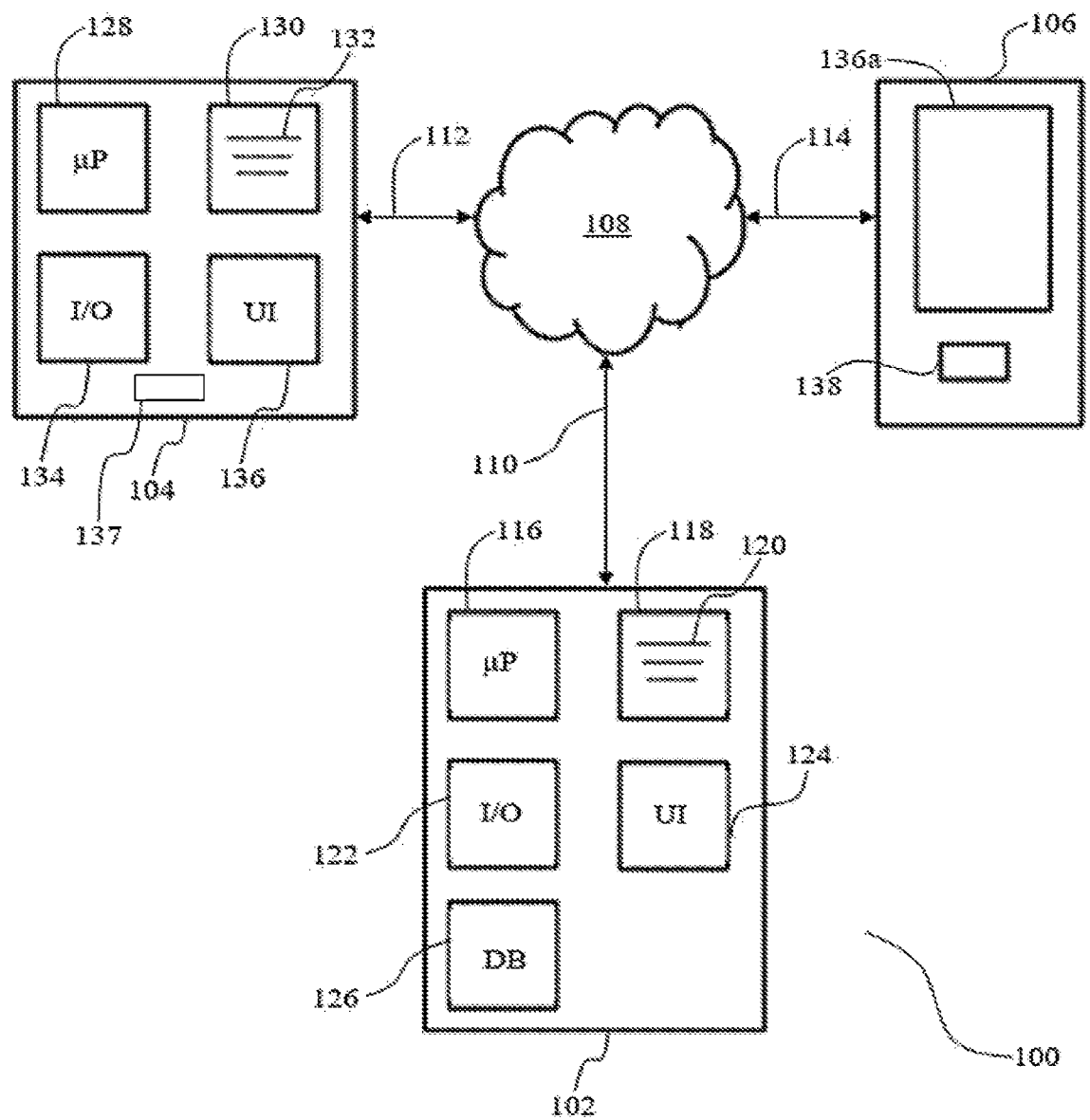
FIG. 1 is a schematic block diagram illustrating an exemplary communications system involving a communications server apparatus.

Referring first to FIG. 1, a communications system 100 is illustrated, which may be applicable in various embodiments. The communications system 100 may be for generating route navigation data.

The communications system 100 includes a communications server apparatus 102, a first user (or client) communications device 104 and a second user (or client) communications device 106. These devices 102, 104, 106 are connected in or to the communications network 108 (for example, the Internet) through respective communications links 110, 112, 114 implementing, for example, internet communications protocols. The communications devices 104, 106 may be able to communicate through other communications networks, such as public switched telephone networks (PSTN networks), including mobile cellular communications networks, but these are omitted from FIG. 1 for the sake of clarity. It should be appreciated that there may be one or more other communications devices similar to the devices 104, 106.

The communications server apparatus 102 may be a single server as illustrated schematically in FIG. 1, or have the functionality performed by the communications server apparatus 102 distributed across multiple server components. In the example of FIG. 1, the communications server apparatus 102 may include a number of individual components including, but not limited to, one or more microprocessors (µP) 116, a memory 118 (e.g., a volatile memory such as a RAM (random access memory)) for the loading of executable instructions 120, the executable instructions 120 defining the functionality the server apparatus 102 carries out under control of the processor 116. The communications server apparatus 102 may also include an input/output (I/O) module (which may be or include a transmitter module and/or a receiver module) 122 allowing the server apparatus 102 to communicate over the communications network 108. User interface (UI) 124 is provided for user control and may include, for example, one or more computing peripheral devices such as display monitors, computer keyboards and the like. The communications server apparatus 102 may also include a database (DB) 126, the purpose of which will become readily apparent from the following discussion.

The communications server apparatus 102 may be for generating route navigation data.

The user communications device 104 may include a number of individual components including, but not limited to, one or more microprocessors (µP) 128, a memory 130 (e.g., a volatile memory such as a RAM) for the loading of executable instructions 132, the executable instructions 132 defining the functionality the user communications device 104 carries out under control of the processor 128. User communications device 104 also includes an input/output (I/O) module (which may be or include a transmitter module and/or a receiver module) 134 allowing the user communications device 104 to communicate over the communications network 108. A user interface (UI) 136 is provided for user control. If the user communications device 104 is, say, a smart phone or tablet device, the user interface 136 may have a touch panel display as is prevalent in many smart phone and other handheld devices. Alternatively, if the user communications device 104 is, say, a desktop or laptop computer, the user interface may have, for example, one or more computing peripheral devices such as display monitors, computer keyboards and the like. User communications device 104 may also include satnav components 137, which allow user communications device 104 to conduct a measurement or at least approximate the geolocation of user communications device 104 by receiving, for example, timing signals from global navigation satellite system (GNSS) satellites through GNSS network using communications channels, as is known.

The user communications device 106 may be, for example, a smart phone or tablet device with the same or a similar hardware architecture to that of the user communications device 104. User communications device 106, has, amongst other things, user interface 136a in the form of a touchscreen display and satnav components 138. User communications device 106 may be able to communicate with cellular network base stations through cellular telecommunications network using communications channels. User communications device 106 may be able to approximate its geolocation by receiving timing signals from the cellular network base stations through cellular telecommunications network as is known. Of course, user communications device 104 may also be able to approximate its geolocation by receiving timing signals from the cellular network base stations and user communications device 106 may be able to approximate its geolocation by receiving timing signals from the GNSS satellites, but these arrangements are omitted from FIG. 1 for the sake of simplicity.

Figure 2A:
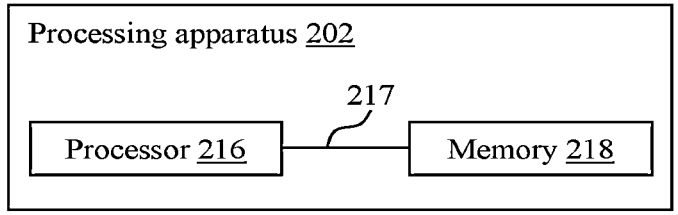
FIG. 2A shows a schematic block diagram illustrating a processing apparatus for generating route navigation data.

FIG. 2A shows a schematic block diagram illustrating a processing apparatus 202 for generating route navigation data.

The processing apparatus 202 includes a processor 216 and a memory 218, where the processing apparatus 202 is configured, under control of the processor 216 to execute instructions in the memory 218 to, generate training data based on road network data corresponding to a network of roads in a defined geographical area, and journey data sets, each journey data set having data indicative of a journey by a road user through the network of roads and being derived using geolocation transmissions from a communications device of the road user, train a classifier model based on the training data, apply the trained classifier model on road data corresponding to a road in the defined geographical area, for the trained classifier model to predict a direction of traffic flow on the road, and generate the route navigation data indicative of the predicted direction of the traffic flow on the road. The processor 216 and the memory 218 may be coupled to each other (as represented by the line 217), e.g., physically coupled and/or electrically coupled.

In other words, there may be provided a processing apparatus 202 for generating route navigation data, for example, for classifying (or to classify) a road. The processing apparatus 202 may generate training data (or training data set) based on road network data corresponding to a network of roads in a defined geographical area, and also based on journey data sets. For each journey data set, the journey data set has data indicative of a journey made or undertaken by a road user through the network of roads and being derived using geolocation transmissions from a communications device of the road user (during the journey).

The processing apparatus 202 may train a classifier model (or prediction model) (e.g., having machine learning algorithm) based on (or using) the training data generated. The classifier model is a machine learning (ML) model. The classifier (or classification) model may be a binary classifier, e.g., a Gradient boosted tree based binary classifier. The classifier model may be provided or stored in the processing apparatus 202, e.g., in the memory 218, or the classifier model may be stored or provided in another location and may be received by or accessible to the processing apparatus 202.

The processing apparatus 202 may apply the classifier model (or prediction model) that has been trained on road data corresponding to a road in the defined geographical area, for the trained classifier model (or trained prediction model) to predict (or determine or classify) a direction of traffic flow on the road. In other words, the road data may be inputted to the trained classifier model for the trained classifier model to output a prediction on the direction of the traffic flow on the road. The road whose direction of traffic flow is to be determined may be part of the network of roads in the defined geographical area.

In the context of various embodiments, the road data may include the same type of data included in or forming part of the training data.

The processing apparatus 202 may then generate the route navigation data indicative of the predicted direction of the traffic flow (or direction of travel, DoT). In this way, the processing apparatus 202 may classify the road according to the generated route navigation data, or the predicted direction of the traffic flow or DoT.

In the context of various embodiments, a road may have or may be made up of one or more road segments, and at least two nodes. Each road may have a (unique) road ID. A road segment may be defined between two nodes of the road. Each node of the road may be assigned a (unique) node identifier (ID).

In the context of various embodiments, each journey data set may include data related to or corresponding to the journey taken by a road user, which may, for example, be undertaken using a vehicle. The journey may include travelling through the network of roads. Each journey data set may include data of at least one of position or location data corresponding to the road user during or along the journey (e.g., in terms of spatial coordinates, such as latitude and longitude), orientation relative to a reference (e.g., north), speed of travel (e.g., vehicle speed), timestamp, ID of the origin of the geolocation transmissions (e.g., communications device ID, vehicle ID, etc.), road ID, node ID, etc.

In the context of various embodiments, the geolocation transmissions from a communications device may include data of at least one of an identifier (or ID) of the origin of the geolocation transmissions (e.g., communications device ID, vehicle ID, etc.), position or location data corresponding to the road user during or along the journey (e.g., in terms of spatial coordinates, such as latitude and longitude, e.g., associated with roads), orientation relative to a reference (e.g., north), speed of travel (e.g., vehicle speed), timestamp, etc.

In the context of various embodiments, the geolocation transmissions may be provided from the communications device at intervals (during the journey). The geolocation transmissions may include position or location data corresponding to the road user during or along the journey. The geolocation transmissions may include data derived from a global navigation satellite system (GNSS), e.g., global positioning system (GPS). The geolocation transmissions, for example, may be or may include (raw) GPS data or GPS pings.

The geolocation transmissions from the communications device of a road user may be distinct from the geolocation transmissions from the communications device of another road user, for example, identifiable based on the ID of the communications device. Hence, based on such distinct geolocation transmissions, the count or number of road users travelling through the network of roads may be determined or computed.

The geolocation transmissions from the communications devices of road users may be transmissions that occurred over a defined time period, for example, one month.

In the context of various embodiments, the geolocation transmissions may be provided via any suitable communications networks, for example, via wifi, (mobile) cellular communications network, etc.

In the context of various embodiments, the geolocation transmissions may be (transmitted) to the processing apparatus 202.

In the context of various embodiments, the geolocation transmissions may be (transmitted) from a communications device that includes, but not limited to, a smart phone, tablet, handheld/portable communications device, location tracking device, navigation device (including an in-vehicle navigation device), etc.

In the context of various embodiments, the geolocation transmissions may be generated from apps (e.g., ride-hailing apps) resident on road users' mobile phones. The geolocation transmissions may be transmitted (e.g., periodically) by the users' mobile phone apps as the users undertake the corresponding journeys, for example, to the processing apparatus 202 or a server.

In the context of various embodiments, the defined geographical area may be or may include, for example, a town, a city, a state, a prefecture, a region, or a country.

In various embodiments, for predicting the direction of the traffic flow on the road, the processing apparatus 202 may, using the trained classifier model, predict whether the traffic flow is uni-directional (i.e., one-way) or bi-directional (i.e., two-way).

The processing apparatus 202 may transmit or communicate the route navigation data to another (communications) device.

The processing apparatus 202 may store the route navigation data, e.g., in the memory 218 or in an external memory.

In the context of various embodiments, data that are generated by the processing apparatus 202 may be generated in (or for) one or more data records. The one or more data records may include one or more data fields for the corresponding data. As a non-limiting example, the one or more data fields may include one or more route navigation data fields and the processing apparatus 202 may generate, for or in the one or more route navigation fields, the route navigation data.

The one or more data records may be associated with or accessible by the processing apparatus 202. The one or more data records may be generated by the processing apparatus 202. The one or more data records may be modified or updated by the processing apparatus 202. The one or more data records may be stored at the processing apparatus 202, e.g., in the memory 218.

The road network data may be stored in the processing apparatus 202, e.g., in the memory 218, or the road network data may be stored in another location and may be received by or accessible to the processing apparatus 202.

In the context of various embodiments, the road network data may include, but not limited to, data or information on at least one of a plurality of roads within the network, one or more road segments of each road, one or more nodes of each road, relationship between the roads (e.g., including any connection therebetween), geometrical layout of the network, direction of traffic on respective roads (e.g., including whether the roads may be roads for one way traffic or bi-directional traffic), intersection nodes, traffic light arrangements, road classification (e.g., whether the roads are major or minor roads, residential roads, highways, etc.), dimensions of the roads (e.g., lengths, widths), names of the roads, data or information (e.g., names, addresses, etc.) on one or more points-of-interest (POIs) within the network, etc.

In the context of various embodiments, the road data may be stored in the processing apparatus 202, e.g., in the memory 218, or the road data may be stored in another location and may be received by or accessible to the processing apparatus 202.

For generating the training data, the processing apparatus may generate (or derive) road data sets from the road network data and the journey data sets, and, wherein, for each road data set, the road data set may include data associated with a respective road in the network of roads.

For each respective road, the road data set (or the data associated with the respective road) may include count data indicative of a count (or number) of the geolocation transmissions associated with the respective road, and entropy data indicative of an entropy in a direction of traffic flow on the respective road, wherein the count and the entropy may be derived from the journey data sets. The entropy refers to Shannon's entropy (for defining or quantifying the uncertainty in the direction of traffic flow along a road).

For each respective road, the road data set (or the data associated with the respective road) may include length data indicative of a length of the respective road, first road count data indicative of a first road count (or number) of incoming roads associated with nodes constituting the respective road, second road count data indicative of a second road count (or number) of outgoing roads associated with the nodes, percentage data indicative of a percentage of the incoming roads and the outgoing roads being roads for uni-directional traffic flow (i.e., one-way road), and probability data indicative of a probability of the respective road being a road for uni-directional traffic flow (i.e., one-way road) according to a road type of the respective road, wherein the length, the first road count, the second road count, the percentage, and the probability may be derived from the road network data.

The processing apparatus 202 may process the road network data to identify incoming roads and outgoing roads intersecting with the respective road. The processing apparatus 202 may process the road network data to identify the nodes constituting the respective road. An incoming road is for incoming traffic leading to a node constituting the respective road. It should be appreciated that the incoming road may intersect the respective road. An outgoing road is for outgoing traffic leading away from a node constituting the respective road. It should be appreciated that the outgoing road may intersect the respective road.

The processing apparatus 202 may, for applying the trained classifier model on the road data, apply the trained classifier model on the road data to generate prediction data indicative of a predicted probability of the road being for uni-directional traffic flow or bi-directional traffic flow for predicting the direction of traffic flow on the road.

For example, the processing apparatus 202 may generate at least one of a first prediction data indicative of a first predicted probability (e.g., pred_prob_oneway or pred_prob_uni or the like) of the road being for uni-directional traffic flow or a second prediction data indicative of a second predicted probability (e.g., pred_prob_twoway or pred_prob_bi or the like) of the road being for bi-directional traffic flow. As a non-limiting example, if the first predicted probability exceeds a defined threshold value (e.g., 0.5), the road may be predicted to be for uni-directional traffic flow.

The processing apparatus 202 may further, in response to a request from a user to access data associated with the road in the defined geographical area, communicate the route navigation data to a (communications) device of the user for communicating the predicted direction of the traffic flow on the road to the user.

The processing apparatus 202 may further process the route navigation data to generate at least one of visual information or audio information for communicating the predicted direction of the traffic flow on the road to the user. The visual information may, for example, include an arrow pointing in the direction of traffic flow. The arrow may be superimposed onto the road for indicating the direction of traffic flow on the road. As non-limiting examples, a single arrow may be provided for uni-directional traffic flow, while a pair of arrows pointing in opposite directions may be provided for bi-directional traffic flow.

The processing apparatus 202 may further process the route navigation data and data indicative of a digital map representative of the defined geographical area for displaying the digital map with information corresponding to the predicted direction of the traffic flow on the road. The data indicative of the digital map may be stored in the processing apparatus 202, e.g., in the memory 218, or the data indicative of the digital map may be stored in another location and may be received by or accessible to the processing apparatus 202.

The (communications) device through which at least one of the route navigation data, visual and/or audio information, or digital map with information corresponding to the predicted direction of the traffic flow on the road may be provided or displayed to a user may include, but not limited to, a smart phone, tablet, handheld/portable communications device, desktop or laptop computer, terminal computer, navigation device (including an in-vehicle navigation device), etc.

Figure 2B:
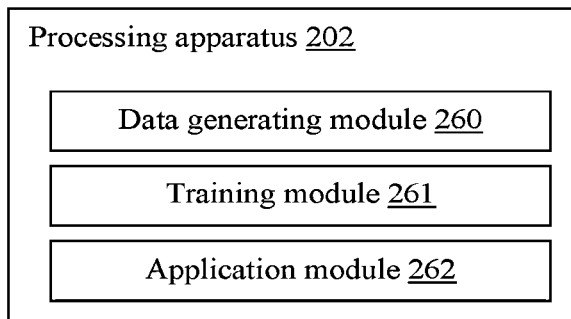
FIG. 2B shows a schematic block diagram illustrating architecture components of the processing apparatus of FIG. 2A.

FIG. 2B shows a schematic block diagram illustrating architecture components of the processing apparatus 202. That is, the processing apparatus 202 may further include a data generating module 260, a training module 261, and an application module 262. The data generating module 260 may generate the training data and/or the route navigation data. The training module 261 may train the classifier module. The application module 262 may apply the trained classifier model on the road data.

In the context of various embodiments, the processing apparatus 202 may be or may include a communications server apparatus, and may, for example, be as described in the context of the server device 102 (FIG. 1). The processor 216 may be as described in the context of the processor 116 (FIG. 1) and/or the memory 218 may be as described in the context of the memory 118 (FIG. 1).

In the context of various embodiments, the processing apparatus 202 may be a single server, or have the functionality performed by the processing apparatus 202 distributed across multiple apparatus components.

In the context of various embodiments, the processing apparatus 202 may be or may include a (communications) device of a (road) user.

Figure 2C:
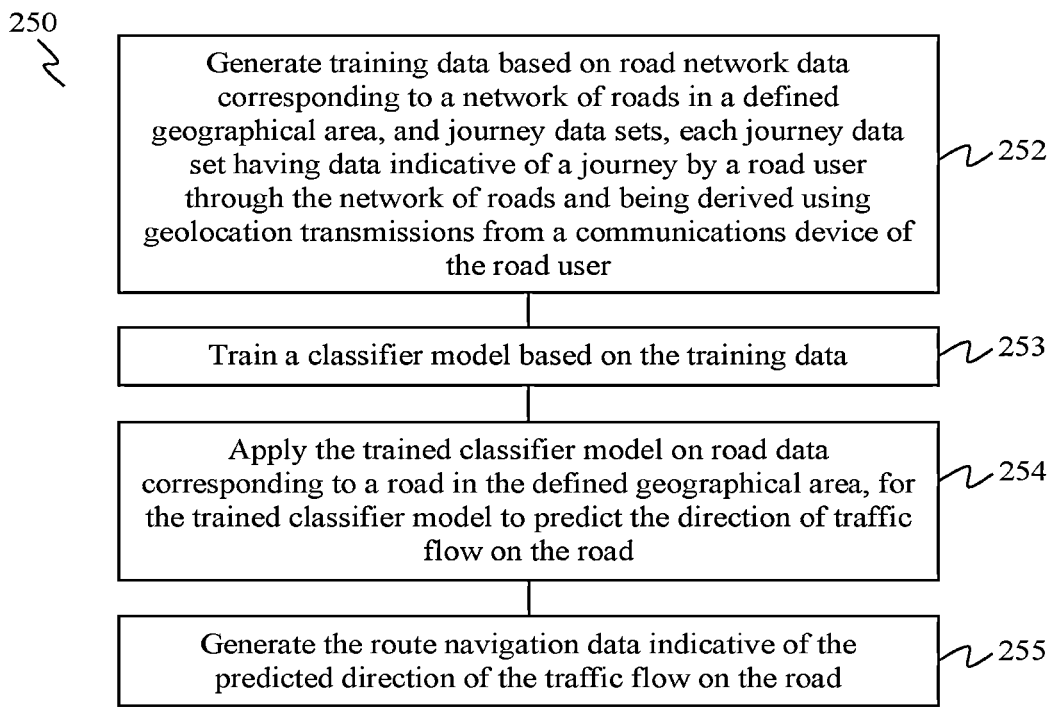
FIG. 2C shows a flow chart illustrating a method for generating route navigation data.

FIG. 2C shows a flow chart 250 illustrating a method for generating route navigation data. The method may be a computer-implemented method.

At 252, training data is generated based on road network data corresponding to a network of roads in a defined geographical area, and journey data sets, each journey data set having data indicative of a journey by a road user through the network of roads and being derived using geolocation transmissions from a communications device of the road user.

At 253, a classifier model is trained based on or using the training data.

At 254, the trained classifier model is applied on road data corresponding to a road in the defined geographical area, for the trained classifier model to predict a direction of traffic flow on the road.

At 255, the route navigation data indicative of the predicted direction of the traffic flow on the road is generated.

In various embodiments, at 252, road data sets may be generated from the road network data and the journey data sets, and, wherein, for each road data set, the road data set may include data associated with a respective road in the network of roads.

For each respective road, the road data set (or the data associated with the respective road) may include count data indicative of a count of the geolocation transmissions associated with the respective road, and entropy data indicative of an entropy in a direction of traffic flow on the respective road, wherein the count and the entropy may be derived from the journey data sets.

For each respective road, the road data set (or the data associated with the respective road) may include length data indicative of a length of the respective road, first road count data indicative of a first road count of incoming roads associated with nodes constituting the respective road, second road count data indicative of a second road count of outgoing roads associated with the nodes, percentage data indicative of a percentage of the incoming roads and the outgoing roads being roads for uni-directional traffic flow, and probability data indicative of a probability of the respective road being a road for uni-directional traffic flow according to a road type of the respective road, wherein the length, the first road count, the second road count, the percentage, and the probability may be derived from the road network data.

In various embodiments, at 254, the method may include applying the trained classifier model on the road data to generate prediction data indicative of a predicted probability of the road being for uni-directional traffic flow or bi-directional traffic flow for predicting the direction of traffic flow on the road.

The method may further include, in response to a request from a user to access data associated with the road in the defined geographical area, communicating the route navigation data to a device of the user for communicating the predicted direction of the traffic flow on the road to the user.

The method may further include processing the route navigation data to generate at least one of visual information or audio information for communicating the predicted direction of the traffic flow on the road to the user.

The method may further include processing the route navigation data and data indicative of a digital map representative of the defined geographical area for displaying the digital map with information corresponding to the predicted direction of the traffic flow on the road.

The method as described in the context of the flow chart 250 may be performed in a processing apparatus (e.g., 202; FIG. 2A) for generating route navigation data, under control of a processor of the apparatus.

It should be appreciated that descriptions in the context of the processing apparatus 202 may correspondingly be applicable in relation to the method as described in the context of the flow chart 250, and vice versa.

There may also be provided a computer program product having instructions for implementing the method for generating route navigation data as described herein.

There may also be provided a computer program having instructions for implementing the method for generating route navigation data as described herein.

There may further be provided a non-transitory storage medium storing instructions, which, when executed by a processor, cause the processor to perform the method for generating route navigation data as described herein.

Various embodiments may determine the direction of travel (DoT) on a road, using information from GPS data and the road network graph. It should be appreciated that GPS data is a non-limiting example, and that any suitable global navigation satellite system (GNSS) data may be used in the techniques disclosed herein.

The techniques disclosed herein may process raw GPS data (GPS ping) obtained from or associated with vehicles to obtain certain information (including travelling directions of the vehicles) to localise the position of the vehicles onto a road on a digital road network. The processed GPS data (snapped GPS ping) may include data corresponding to nodes on the road.

For each road having at least a certain number of snapped GPS pings (e.g., ≥30) over a defined time period (e.g., past one month), the techniques may derive,
  (i) from snapped driver trajectories (which is a timestamp order sequence of snapped GPS pings for a particular vehicle for a trip from the vehicle's origin to destination),
    the number of snapped GPS pings, and
    entropy in driving direction.
      The number of snapped GPS pings in one direction from, say, node 1 to node 2, and the number of snapped GPS pings in the reverse direction from node 2 to node 1 may be used to determine the entropy (e.g., Shannon's entropy);
  and
  (ii) from the road network graph,
    length of the road (for example, length of "Road X"),
    number of incoming and outgoing roads (e.g., total number of incoming roads and the total number of outgoing roads for all nodes that constitute or are associated with "Road X", without counting "Road X" itself), percentage of the incoming and outgoing roads being one-way, and prior probability of road being one-way based on its road type (e.g., motorway, primary road, residential, pedestrian, etc. based on the "OpenStreetMap" definition of road types). The prior probability for each road type is dependent on the specific city and may be obtained from the existing road network graph for the city being examined for classification of DoT.

Information derived from (i) and (ii) above may then be fed to a machine learning model (e.g., binary classifier), which may subsequently be used to predict whether a road is a one-way road or a bi-directional road. A predicted probability value may be determined for a particular road.

For example, if the value corresponding to the predicted probability for one way ("pred_prob_oneway") for a specific road is above a threshold value, said road is classified as a one-way road; otherwise, it is classified as a bi-directional road.

Various embodiments or techniques will now be further described in detail.

Generally, a road network may be represented as a directed graph G(V, E), where V refers to a set of nodes and E refers to a set of directed edges connecting the nodes. Two nodes may be linked by an "edge", referring to a road segment or a road, depending on the context. Multiple road segments may make up a road. A node may be associated with one or more incoming edges leading to the node, and/or one or more outgoing edges leading away from the node. The network graph structure may enable identification of the roads connected to each node, including incoming road(s) to the node and outgoing road(s) from the node, and the number thereof.

A road on a road network graph may have 2 or more nodes. If a road has "n" nodes, the road may have "n−1" edges or segments. Each road has a road ID, and each node has a node ID. Each segment is generally a straight line segment. The curvature of a road, thus, may be given by multiple line segments (or road segments).

Figure 3:
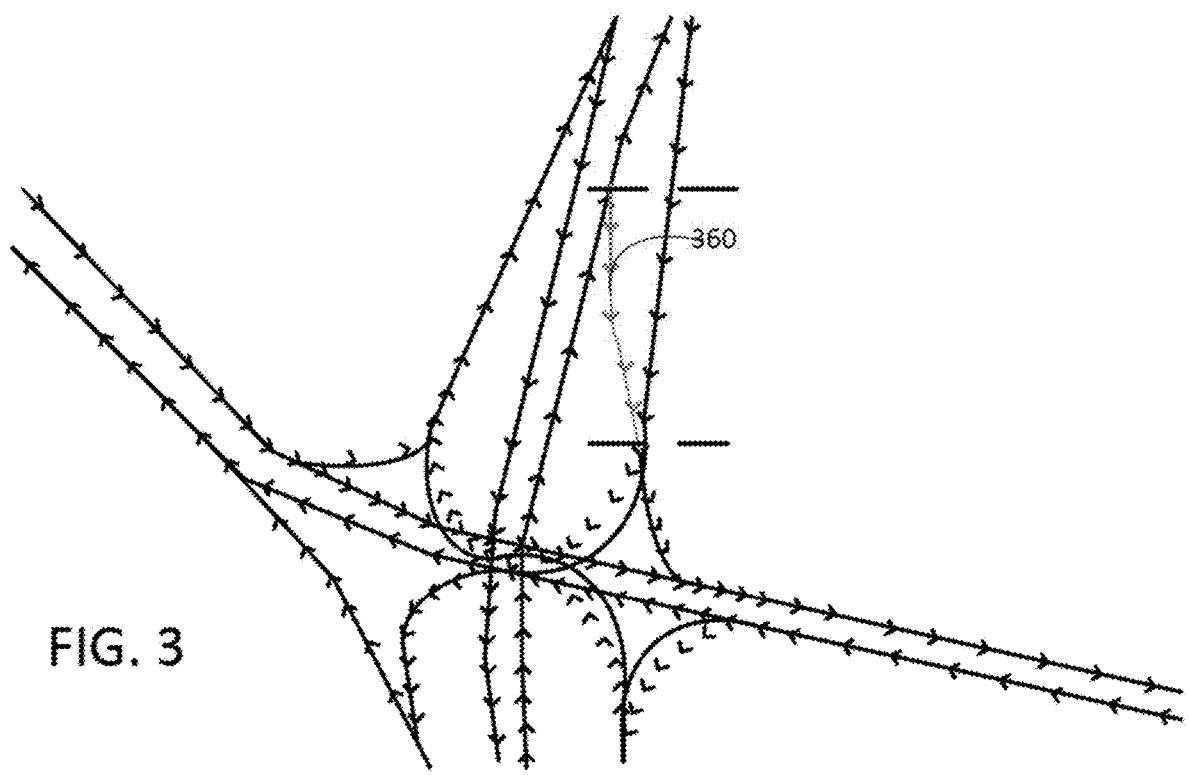
FIG. 3 shows an example of a section of a road network graph.

FIG. 3 shows an example of a section of a road network graph. Using the road 360, with its boundaries indicated with the two dashed lines, as a non-limiting example, the road 360 may have an identifier or ID (i.e., road ID), e.g., 22718052. While not clearly shown in FIG. 3, road 360 has 11 road segments and 12 nodes. In FIG. 3, nodes are represented by the arrow heads while road segments are defined by the lines between respective two adjacent nodes. Each node may have its own identifier or ID (i.e., node ID), e.g., 133745557, 6076301329, 6076301328, etc.

Referring to FIG. 3, roads with cross marks ("×") represent bi-directional roads with two-way traffic, while roads with arrows (e.g., road 360) represent one-way roads.

Further, the graph structure, similar to that shown in FIG. 3, may allow identification of the number of incoming and outgoing edges, i.e., roads at every node in the road network graph.

The techniques disclosed herein may make use of GPS data. A GPS ping (raw GPS data) of a vehicle may be defined by a tuple given by (vehicle_id, latitude, longitude, vehicle_bearing, speed, timestamp, accuracy). The various parameters may be defined as follows:

vehicle_id is a unique ID for each and every vehicle;
latitude and longitude represent the location of the vehicle at a given timestamp;
bearing indicates the orientation of the vehicle to true north;

accuracy is defined as the radius of 68% confidence. If a circle is drawn centered at the latitude and longitude, and with a radius equal to the accuracy, then, there is a 68% probability that the true location is inside the circle.

Using an algorithmic procedure called "map-matching" (also referred to as "snap-to-road"), the position of the vehicle may be localised onto a digital road network, i.e., the road (e.g., in terms of the road ID) the vehicle is driven on. Map matching may remove GPS noise to infer the exact position (relatively) of the vehicle on the road network.

Thus a map matched or snapped GPS ping (or processed GPS data) may be a tuple of the form (vehicle_id, speed, timestamp, road_id, start_node, end_node, accuracy). The parameters start_node and end_node indicate two successive nodes, i.e., in the node ID sequence constituting the road. This may mean that a valid start_node, end_node pair may represent two adjacent nodes, with a road segment defined therebetween.

The techniques disclosed herein may also make use of a vehicle's trajectory, which represents a timestamp order sequence of pings or snapped driver pings for a particular vehicle ID for a trip from the vehicle's origin to destination.

In various embodiments, the roads in the road network graph may be tagged based on their importance with regards to the network as a whole. Different road types may be used in the techniques disclosed herein, which, for example, may follow the OpenStreetMap definition of road types (https://wiki.openstreetmap.org/wiki/Key:highway #Values).

Techniques disclosed herein may enable verification and validation of direction of travel (DoT) on roads by leveraging driver trajectories and ML models. Further, techniques disclosed herein may provide for rule based modelling of traffic. A methodology may be provided to identify nodes and the corresponding incoming and outgoing roads. Such information can also be leveraged by travel time estimation models as well as being relevant (and potentially crucial) for navigation purposes.

Techniques disclosed herein may enable validation and correction of DoT. As a non-limiting example, the techniques disclosed herein may automatically detect and validate (and correct if necessary) the direction of travel, e.g., classify a given road segment in the map as one-way or bidirectional. Classification of DoT is required for navigation, since a wrongly tagged DoT on roads, however minor, may result in poor user experience and, even worse, undesirable incidents such as accidents.

The techniques disclosed herein may employ machine learning (ML) for determining the direction of travel and/or classifying a road as one-way or bidirectional travel. One challenge in implementing an ML model (e.g., a binary classifier) to classify a road as either one-way or bidirectional may be the lack or absence of ground truth labels. To address this challenge, a defined region, e.g., a particular city, may be chosen as the ground truth. As a non-limiting example, Singapore may be chosen as a reasonable ground truth to train an ML model, as there is an advanced and accurate map infrastructure, where, generally, a large percentage (e.g., >99%) of roads have correct classification in terms of DoT.

A number of parameters or features may be suitably chosen before and for training an ML model (e.g., a DoT classifier) which can scale for multiple or various cities. Some of these features used for the model may include, but not limited, to the features shown in Table 1 below.

TABLE 1

Features for DoT classification

| Field | Description |
|---|---|
| Number of pings | The number of successful map-matched driver pings on the road during the time period over which the vehicle flow data was collected |
| entropy | Entropy quantifies the uncertainty in the direction of vehicular flow along the way. Note that $0.0 \leq$ entropy $\leq \log(n)$, where n is the number of outcomes. Greater the value of entropy greater is the likelihood of the road being bi-directional. |
| Probability of road being one-way | This is a prior probability of a road being one-way given that it belongs to a particular road type and this varies across different cities this feature can easily be transferred across different cities. |
| road length | The length of the way 3 meters. |
| Number of coming roads | Number of incoming roads from any of the nodes constituting the road being classified |
| Number of outgoing roads | Number of outgoing roads from any of the nodes constituting the road being classified |
| Percentage one-way | Percentage of the incoming and outgoing roads being one-way |

The features listed in Table 1 may be determined or obtained based on GPS pings and road network data. The first two features, namely the number of pings and entropy, may be determined or calculated from GPS probe data obtained from, for example, transport-related services. The remaining features may be determined based on the corresponding road network graph.

The prior probability based on road type as a feature may vary based on the city and country this is used for. For example, see Table 2 showing the difference in the distribution of one way roads for "residential" and "primary" roads (based on the OpenStreetMap definition) in Jakarta and Singapore. Further, available DoT classification on road segments may be accurate to the tune of 95% and more. Hence, this is information that can already be used to increase the accuracy of the DoT classification model in various embodiments. It should be appreciated that any ML model considering the road type as a feature (for example, based on Singapore) may have poor accuracy when used for predicting or classifying roads for other cities (e.g., Jakarta). Such a model having a feature based on road type may face challenges to be scaled for various cities.

TABLE 2

Example of distribution of one way roads in Singapore and Jakarta

| | Singapore | | Jakarta | |
|---|---|---|---|---|
| Road type | Total count | Percentage one-way | Total count | Percentage one-way |
| primary | 7509 | 99.65 | 5275 | 43.52 |
| residential | 11127 | 44.36 | 289024 | 96.9 |

The purpose or function of the DoT classifier disclosed herein may include at least one of determining classification of roads (for example, in terms of one-way or bidirectional roads), or verifying, validating or correcting the existing classification of one-way and bidirectional roads, in a network of roads or a road network graph. Snapped (driver) GPS pings or processed GPS data may be used for this purpose.

Figure 4:
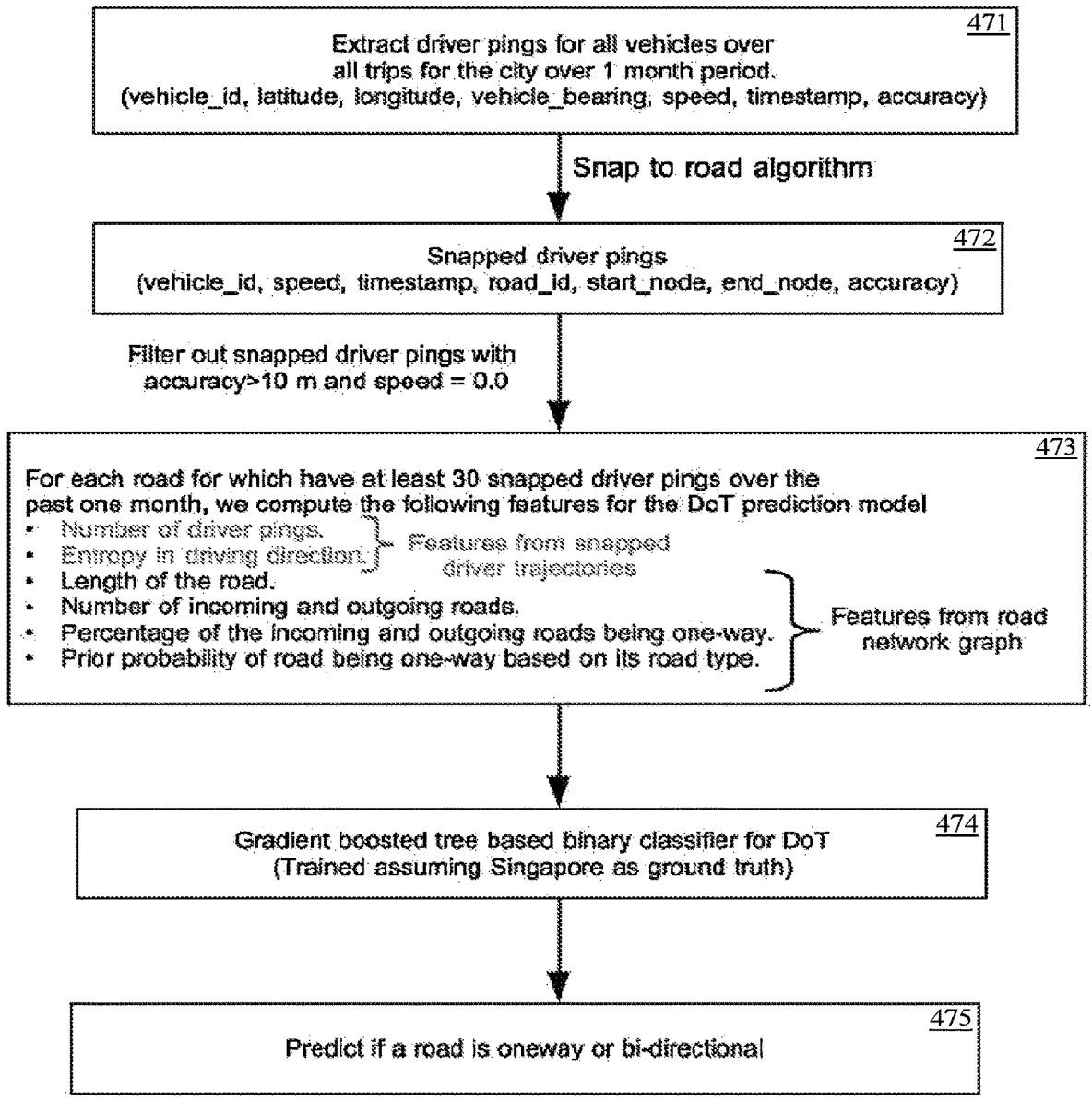
FIG. 4 shows a flow chart for direction of travel (DoT) classification.

FIG. 4 shows a flow chart 470 for direction of travel (DoT) classification, illustrating the DoT classification for a defined city using snapped driver pings (e.g., snapped GPS pings) that may be derived from driver pings (e.g., GPS pings) that contain raw data.

At 471, the driver pings for all vehicles over all trips for a defined city over a defined time period (e.g., one month) may be extracted or obtained. A series of driver pings associated with a vehicle may define a driver trajectory for the vehicle. Each ping may be defined by a tuple given by (vehicle_id, latitude, longitude, vehicle_bearing, speed, timestamp, accuracy).

At 472, a "snap-to-road" algorithm may be used to generate or derive, from the extracted driver pings, snapped driver pings (or processed pings). A series of snapped pings associated with a vehicle may define a snapped driver trajectory for the vehicle. Each snapped ping may be defined by a tuple given by (vehicle_id, speed, timestamp, road_id, start_node, end_node, accuracy). Effectively, the algorithm may map or localise the position of the vehicle onto a (digital) road network, where roads may be identified in terms of their corresponding road IDs.

At 473, the snapped driver pings may be filtered. Snapped pings with an accuracy that is, for example, more than 10 meters, and/or snapped pings that indicate that the associated vehicles are stationary (i.e., speed=0) may be filtered and removed.

Subsequently, for each road with a defined number of snapped pings (e.g., at least 30 snapped driver pings) over a defined time period (e.g., one month), one or more of the following features (or data thereof) may be determined for determining DoT (or for DoT classification) for a road, for example, in a DoT prediction model. The snapped pings may be associated with the same driver or a plurality of (different) drivers.

(1)(a) Number of driver pings, meaning the sum of the number of pings associated with one or more drivers;

(1)(b) Entropy in driving direction;

(2)(a) Length of the road (for example, length of "Road X");

(2)(b) Number of incoming and outgoing roads (e.g., total number of incoming roads and the total number of outgoing roads for all nodes that are associated with "Road X", without counting "Road X" itself);

(2)(c) Percentage of the incoming and outgoing roads being one-way;

(2)(d) Prior probability of road being one-way based on its road type (e.g., motorway, primary road, residential, pedestrian, etc. based on the "OpenStreetMap" definition of road types). The prior probability for each road type is dependent on the specific city and may be obtained from the existing road network graph for the city.

Features (1)(a) and (1)(b) may be determined from snapped driver trajectories or snapped driver pings, while features (2)(a), (2)(b), (2)(c) and (2)(d) may be determined from the road network graph.

Features (1)(a), (1)(b), (2)(a), (2)(b), (2)(c) and (2)(d) may correspond to or may be associated with the defined geographical area for which the DoT for one or more roads in the defined geographical area is to be determined. For example, for determining the DoT of a road in "City A" using a classifier or prediction model, the model is trained using features (1)(a), (1)(b), (2)(a), (2)(b), (2)(c) and (2)(d) obtained for or related to "City A".

At 474, data corresponding to one or more (or all) of the features (1)(a), (1)(b), (2)(a), (2)(b), (2)(c) and (2)(d) may be provided to a ML model or binary classifier (e.g., Gradient boosted tree based binary classifier) for DoT classification. The model or classifier may be trained using a particular city (e.g., Singapore) as the ground truth.

At 475, prediction may be carried out for a road to determine whether the road is a one-way road (i.e., for unidirectional traffic) or bi-directional (i.e., two-way traffic). The trained model or classifier may be used to carry out the determination. In greater detail, road data for the road whose DoT is to be determined may be inputted to the trained model for the trained model to predict the DoT. The road data may include data corresponding to one or more (or all) of the features (1)(a), (1)(b), (2)(a), (2)(b), (2)(c) and (2)(d) described above.

The parameter "entropy" described herein refers to the Shannon's entropy, S, which may be as defined below:

$$S = -\sum_i P_i \log_e P_i, \qquad \text{Equation (1)}$$

where $P_i$ refers to the probability of an i-th event.

As described herein, the entropy in driving direction is a feature for determining DoT, and is a feature for an ML model.

As a non-limiting example, consider an illustrative road ID 101 with 3 nodes (2 road segments) [1, 2, 3]. If the snapped driver trajectories indicate the (start_node, end_node) pair as either (1,2) or (2,3), the direction of travel may be tagged as dir1. Likewise, if the snapped driver trajectories indicate the (start_node, end_node) pair as either (2,1) or (3,2), i.e., in the reverse direction, the direction of travel may be tagged as dir2. The probability over the direction of travel (either dir1 or dir2) may be a binomial probability distribution over the direction of travel (either dir1 or dir2), which can be used for computing the entropy over driver directions. For the illustrative road ID 101, assuming, as a non-limiting example, that there are 1000 snapped driver pings associated with the road ID 101, where 800 are snapped to dir1 (i.e., probability 0.8) and 200 are snapped to dir2 (i.e., probability 0.2), the entropy may be computed as $-(0.8*\ln(0.8)+0.2*\ln(0.2))=0.5$.

For prior probabilities of one-way for the different road types, these may be obtained or determined from the existing road network graph for a city where an approach is taken to verify, validate and correct the classification of roads in the city as one-way or bi-directional.

As a non-limiting example, the current version of the road network graph for the city of Bandung in Indonesia provides the distribution of one-way roads across different road types as shown in Table 3.

TABLE 3

Prior probability of a road type being one-way in the existing road network graph for Bandung, Indonesia

| roadtype | prob_oneway |
|---|---|
| living_street | 0.000000 |
| motorway | 1.000000 |
| motorway_link | 1.000000 |
| pedestrian | 0.050847 |
| primary | 0.349341 |
| primary_link | 0.628205 |
| raceway | 0.000000 |
| residential | 0.009176 |
| road | 0.000000 |
| secondary | 0.262319 |
| secondary_link | 0.509091 |
| service | 0.027166 |
| services | 0.000000 |
| tertiary | 0.134923 |
| tertiary_link | 0.149533 |
| trunk | 0.645889 |
| trunk_link | 0.430508 |
| unclassified | 0.017599 |

Based on Table 3 above, there are no living streets (as per the existing road network graph data) in Bandung which are one-way (i.e., prob_oneway=0.00). For the road type, motorway roads, there are no roads which are bi-directional (i.e., prob_oneway=1.00), meaning that all motorway roads are one-way roads. As another example, for primary roads, 34.9% of the roads are one-way in the existing road network graph for in Bandung.

Input features to the machine learning (ML) model of various embodiments and non-limiting examples thereof may be as shown in Table 4, while the output of the ML model and non-limiting examples thereof may be as shown in Table 5.

TABLE 4

Input features for the ML model for classifying DoT

| | road_ion | num_of_incoming | num_of_outgoing | percentageOneway | num_pings | entropy | prob_oneway |
|---|---|---|---|---|---|---|---|
| 0 | 115.113066 | 3 | 3 | 0.0 | 1.0 | 0.000000 | 0.009176 |
| 1 | 295.293388 | 3 | 3 | 0.0 | 7.0 | 0.863121 | 0.009176 |
| 2 | 1076.304994 | 2 | 2 | 0.0 | 1.0 | 0.000000 | 0.009176 |
| 3 | 125.973903 | 1 | 1 | 0.0 | 23.0 | 0.755375 | 0.009176 |
| 4 | 215.213843 | 2 | 2 | 0.0 | 376.0 | 0.954920 | 0.009176 |

As can be observed, road-id is not an input feature.

The ML model may be trained based on the input features, such as those shown in Table 4. The trained ML model may then be used to predict or determine whether a road is a one-way road or a bi-directional road, such as those shown in Table 5.

TABLE 5

Prediction probabilities of whether a road-id
is bi-directional or not

| | way_id | pred_prob_bi | pred_prob_oneway |
|---|---|---|---|
| 0 | 685779181 | 0.982419 | 0.017581 |
| 1 | 620788522 | 0.999956 | 0.000044 |
| 2 | 885773108 | 0.909472 | 0.090528 |
| 3 | 620768534 | 0.999791 | 0.000209 |
| 4 | 620768835 | 0.999925 | 0.000075 |

It should be appreciated that "way-id" and "road-id" may be used interchangeably. Further, it should be noted that the prediction order shown in Table 5 does not match the feature order in Table 4.

In Table 5, "pred_prob_bi" represents the predicted probability of the road being a bi-directional road, while "pred_prob_oneway" represents the predicted probability of the road being a one-way road. Given the high values in terms of their corresponding "pred_prob_bi", all the roads shown in Table 5 are predicted to be bi-directional roads. In various embodiments, as a non-limiting example, a road may be classified as one-way if "pred_prob_oneway" is greater than 0.5, else the road is classified as bi-directional. In other words, for example, by thresholding on "pred_prob_oneway", a road may be classified, for instance, as one-way if "pred_prob_oneway">0.5.

Figure 5:
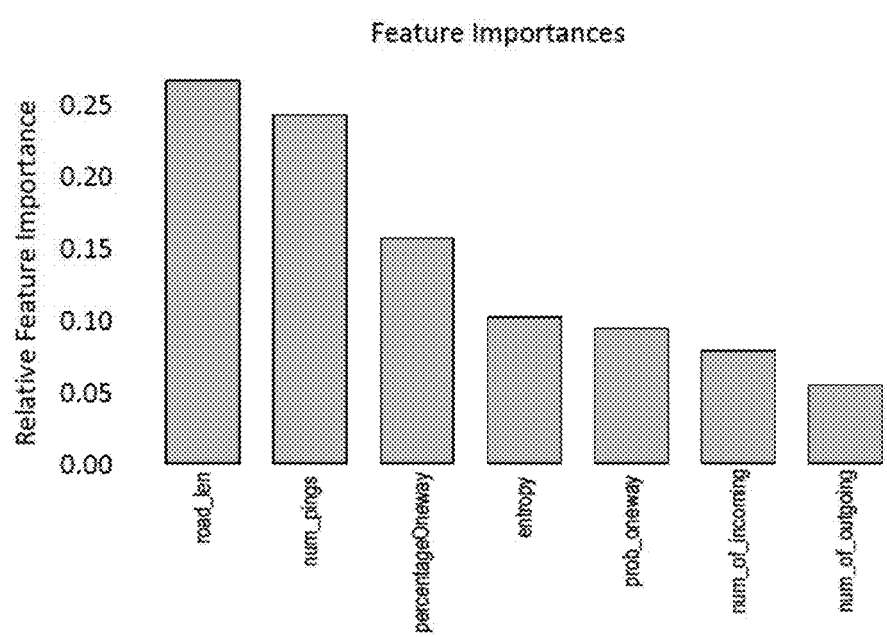
FIG. 5 shows a plot of the feature importance of the input features.

FIG. 5 shows a plot of the feature importance of the input features, illustrating the relative importance (ranking) of the features (from Table 4) for classifying the DoT of a road. FIG. 5 may define the relative feature importance of the one way classifier model of various embodiments. The (relative) feature importance, as generally used in machine learning, indicate how important each feature is compared to the others. The results in FIG. 5 have been calculated using the trained ML model.

As a non-limiting example, evaluation of the results of the DoT model for Jakarta reveals an accuracy of 99.6% in terms of DoT classification.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. A processing apparatus for generating route navigation data, comprising a processor and a memory, the apparatus being configured, under control of the processor to execute instructions in the memory to:
generate training data based on road network data corresponding to a network of roads in a defined geographical area, journey data sets, each journey data set comprising data indicative of a journey made by a road user through the network of roads and being derived using geolocation transmissions from a communications device of the road user, road data sets, the road data sets generated from the road network data and the journey data sets, for each road data set, the road data is associated with a specific road in the network of roads in the road data set, and entropy data indicative of an entropy in a direction of traffic flow on the respective road, wherein the entropy data is derived from the journey data sets;
train a classifier model based on the training data;
apply the trained classifier model on road data corresponding to a road in the defined geographical area, for the trained classifier model to predict a direction of traffic flow on the road; and
generate the route navigation data indicative of the predicted direction of the traffic flow on the road.

2. The processing apparatus as claimed in claim 1, wherein, for each respective road, the road data set further comprises:
count data indicative of a count of the geolocation transmissions associated with the respective road.

3. The processing apparatus as claimed in claim 1, wherein, for each respective road, the road data set comprises:
length data indicative of a length of the respective road;
first road count data indicative of a first road count of incoming roads associated with nodes constituting the respective road;
second road count data indicative of a second road count of outgoing roads associated with the nodes;
percentage data indicative of a percentage of the incoming roads and the outgoing roads being roads for uni-directional traffic flow; and
probability data indicative of a probability of the respective road being a road for uni-directional traffic flow according to a road type of the respective road,
wherein the length, the first road count, the second road count, the percentage, and the probability are derived from the road network data.

4. The processing apparatus as claimed in claim 1, wherein, for applying the trained classifier model on the road data, the processing apparatus is configured to apply the trained classifier model on the road data to generate prediction data indicative of a predicted probability of the road being for uni-directional traffic flow or bi-directional traffic flow for predicting the direction of traffic flow on the road.

5. The processing apparatus as claimed in claim 1, further configured to, in response to a request from a user to access data associated with the road in the defined geographical area, communicate the route navigation data to a device of the user for communicating the predicted direction of the traffic flow on the road to the user.

6. The processing apparatus as claimed in claim 1, further configured to process the route navigation data to generate at least one of visual information or audio information for communicating the predicted direction of the traffic flow on the road to the user.

7. The processing apparatus as claimed in claim 1, further configured to process the route navigation data and data indicative of a digital map representative of the defined geographical area for displaying the digital map with information corresponding to the predicted direction of the traffic flow on the road.

8. A method for generating route navigation data, the method comprising:
generating training data based on road network data corresponding to a network of roads in a defined geographical area, journey data sets, each journey data set comprising data indicative of a journey made by a road user through the network of roads and being derived using geolocation transmissions from a communications device of the road user, road data sets, the road data sets generated from the road network data and the journey data sets, for each road data set, the road data is associated with a specific road in the network of roads in the road data set, and entropy data indicative of an entropy in a direction of traffic flow on the respective road, wherein the entropy data is derived from the journey data sets;

training a classifier model based on the training data;

applying the trained classifier model on road data corresponding to a road in the defined geographical area, for the trained classifier model to predict a direction of traffic flow on the road; and generating the route navigation data indicative of the predicted direction of the traffic flow on the road.

9. The method as claimed in claim 8, wherein, for each respective road, the road data set further comprises:

count data indicative of a count of the geolocation transmissions associated with the respective road.

10. The method as claimed in claim 8, wherein, for each respective road, the road data set comprises:

length data indicative of a length of the respective road;

first road count data indicative of a first road count of incoming roads associated with nodes constituting the respective road;

second road count data indicative of a second road count of outgoing roads associated with the nodes;

percentage data indicative of a percentage of the incoming roads and the outgoing roads being roads for uni-directional traffic flow; and probability data indicative of a probability of the respective road being a road for uni-directional traffic flow according to a road type of the respective road, wherein the length, the first road count, the second road count, the percentage, and the probability are derived from the road network data.

11. The method as claimed in claim 8, wherein, for applying the trained classifier model on the road data, the processing apparatus is configured to apply the trained classifier model on the road data to generate prediction data indicative of a predicted probability of the road being for uni-directional traffic flow or bi-directional traffic flow for predicting the direction of traffic flow on the road.

12. The method as claimed in claim 8, further configured to, in response to a request from a user to access data associated with the road in the defined geographical area, communicate the route navigation data to a device of the user for communicating the predicted direction of the traffic flow on the road to the user.

13. The method as claimed in claim 8, further configured to process the route navigation data to generate at least one of visual information or audio information for communicating the predicted direction of the traffic flow on the road to the user.

14. The method as claimed in claim 8, further configured to process the route navigation data and data indicative of a digital map representative of the defined geographical area for displaying the digital map with information corresponding to the predicted direction of the traffic flow on the road.

15. A computer program or a computer program product comprising instructions for implementing the method as claimed in claim 8.

16. A non-transitory storage medium storing instructions, which when executed by a processor cause the processor to perform the method as claimed in claim 8.

* * * * *